Patented Dec. 14, 1948

2,456,581

UNITED STATES PATENT OFFICE 2,456,581

PROCESS FOR PREPARING METACRESOL-1,3,4-XYLENOL

Francis E. Cislak and Merritt M. Otto, Indianapolis, Ind., assignors to Reilly Tar & Chemical Corporation, Indianapolis, Ind., a corporation of Indiana No Drawing. Application August 20, 1945, Serial No. 611,694

10 Claims. (Cl. 260—619)

Our invention relates to the separation of metacresol from mixtures containing metacresol and paracresol.

It is the object of our present invention to obtain the individual metacresol; and to obtain the new compound metacresol-1,3,4,-xylenol.

A mixture of metacresol and paracresol, associated with various other phenolic bodies, is obtained in the processing of coal tar and petroleum. The other phenolic bodies commonly present, including orthocresol, can be separated quite readily and fairly completely from the mixture of metacresol and paracresol by fractional distillation. But the boiling points of the metacresol and the paracresol are so close together that it is not commercially practical to separate them by fractional distillation.

We have found that by treating with 1,3,4-xylenol (1,3-dimethyl-4-hydroxybenzene) a mixture of metacresol and paracresol containing from 25% upward of metacresol, whether or not the mixture also contains small amounts of higher and/or lower related phenolic bodies (such as orthocresol and the xylenols), and cooling, either before and/or after and/or during the mixing we get a formation of crystals of metacresol-1,3,4-xylenol, an addition product of some character composed of one molecule of metacresol and one molecule of 1,3,4-xylenol. The cooling is desirably to a temperature at least as low as 0° C., but rarely needs to be below —10° C. These crystals can readily be recovered as by decanting or filtering; and can readily be reconverted into substantially pure metacresol and substantially pure 1,3,4-xylenol, as by fractional distillation.

Upon the recovery of the crystals of metacresol-1,3,4-xylenol, by the decanting or filtering above referred to, the mother liquor remaining is much enriched in paracresol, in comparison with the original metacresol-paracresol mixture; and also contains considerable 1,3,4-xylenol and some metacresol. After separating the 1,3,4-xylenol from this mother liquor, as by fractional distillation, the mixture of metacresol-paracresol may be used as a source of paracresol, as by the procedure set forth in our copending application Serial No. 507,017, filed October 20, 1943, now U. S. Patent 2,432,063, issued December 2, 1947.

The metacresol-1,3,4-xylenol recovered as aforesaid is a new compound. It has a melting point of about 23° C. It is of interest in the preparation of disinfectants and insecticides, as well as in the present process of separating metacresol from paracresol.

The following example illustrates our invention.

Example

One hundred pounds of a commercial mixture of metacresol and paracresol, containing about 55–60% metacresol, is thoroughly mixed with about 115–125 pounds of 1,3,4-xylenol. With these proportions there is a molecular excess of 1,3,4-xylenol; which we deem desirable, although it is not essential. The mixing can be done with the ingredients cold, or preferably the mixture may be cooled after the mixing, in either case to obtain a temperature of about 0° C. to —10° C. By such cooling the addition product, metacresol-1,3,4-xylenol, usually crystallizes spontaneously from the mixture, although sometimes it is necessary to start crystallization by seeding with crystals of metacresol-1,3,4-xylenol. The crystals of metacresol-1,3,4-xylenol produced by the cooling are suitably separated, most conveniently by filtration. Although it is not necessary to do so, we prefer to wash these crystals with a cooled inert solvent, such as paraffinic petroleum naphtha, to remove any mother liquor adhering to the crystals. The crystals of metacresol-1,3,4-xylenol are subjected to fractional distillation, which decomposes them into metacresol and 1,3,4-xylenol, whereupon the metacresol distills over first. As so recovered, the metacresol is usually of about 90% to 98% purity.

We have found that, at times, it is advantageous to add an inert diluent to the mixture of metacresol-paracresol and 1,3,4-xylenol. The presence of 5% to 10% of such an inert diluent is helpful, although it is not necessary, in separating the crystals of metacresol-1,3,4-xylenol from the mother liquor when the percentage of metacresol in the metacresol-paracresol mixture is high—of the order of 65% or more. One such inert diluent which we have found useful is a paraffinic petroleum naphtha of the VMP type.

In the above example the mixture of metacresol-paracresol contains about 55–60% metacresol. Our process is suitable for recovering pure metacresol from mixtures of metacresol-paracresol containing as little as 25% to 30% metacresol.

A process of producing metacresol 1,3,4-xylenol is disclosed in our co-pending application Serial No. 611,695, filed concurrently with this application.

We claim:

1. The process of separating metacresol from a mixture consisting mainly of metacresol and paracresol with the metacresol content being of from 25% upward, which consists in mixing such a mixture with 1,3,4-xylenol and producing in the resulting mixture a sufficiently low temperature to form crystals of metacresol-1,3,4-xylenol, separating such crystals, and recovering metacresol in purified form from the crystals.

2. The process of separating metacresol from a mixture consisting mainly of metacresol and paracresol, with the metacresol content being of from 25% upward, which consists in mixing such a mixture with a molecular excess of 1,3,4-xylenol and producing in the resulting mixture a sufficiently low temperature to form crystals of metacresol-1,3,4-xylenol, separating such crystals, and recovering metacresol in purified form from the crystals.

3. The process of separating metacresol from a mixture consisting mainly of metacresol and paracresol with the metacresol content being of from 25% upward, which consists in mixing such a mixture with 1,3,4-xylenol and crystallizing metacresol-1,3,4-xylenol from the resulting mixture, separating the crystals so produced, and recovering the metacresol in purified form from such crystals.

4. The process of producing metacresol-1,3,4-xylenol, which consists in mixing 1,3,4-xylenol and a mixture consisting mainly of metacresol and paracresol with the metacresol content being of from 25% upward, and producing in the resulting mixture a sufficiently low temperature to form crystals of metacresol-1,3,4-xylenol.

5. The process of producing metacresol-1,3,4-xylenol which consists in mixing 1,3,4-xylenol and a mixture consisting mainly of metacresol and paracresol with the metacresol content being of from 25% upward, and crystallizing metacresol-1,3,4-xylenol from the resulting mixture.

6. The process of producing metacresol as set forth in claim 3, in which the metacresol is recovered from the crystals of metacresol-1,3,4-xylenol by fractional distillation.

7. The process of producing metacresol as set forth in claim 1, in which the temperature used to produce crystallization is at least as low as 0° C.

8. The process of producing a metacresol-1,3,4-xylenol as set forth in claim 4 in which the temperature used to produce crystallization is at least as low as 0° C.

9. The process of separating metacresol from a mixture consisting mainly of metacresol and paracresol which consists in mixing a mixture of metacresol and paracresol, the metacresol content being at least 65%, with 1,3,4-xylenol, and in the presence of an inert diluent and producing in the resulting mixture a sufficiently low temperature to form crystals of metacresol-1,3,4-xylenol, separating such crystals, and recovering metacresol in purified form from the crystals, the diluent serving to assist in separation of the crystals from the mother liquor.

10. The process of separating metacresol from a mixture consisting mainly of metacresol and paracresol which consists in mixing a mixture of metacresol and paracresol, the metacresol content being of from 25% upward, with 1,3,4-xylenol, and in the presence of an inert diluent and producing in the resulting mixture a sufficiently low temperature to form crystals of metacresol-1,3,4-xylenol, separating such crystals, and recovering metacresol in purified form from the crystals, the diluent serving to assist in separation of the crystals from the mother liquor.

FRANCIS E. CISLAK.
MERRITT M. OTTO.

REFERENCES CITED

The following references are of record in the file of this patent:

UNITED STATES PATENTS

| Number | Name | Date |
|---|---|---|
| 2,042,331 | Carswell | May 26, 1936 |

OTHER REFERENCES

Field, "Industrial and Engineering Chemistry," vol. 32, pages 491–2 (1940).

Field et al., Ind. Eng. Chem., vol. 32, No. 4, page 493 (1 page only) (April, 1940).